(12) United States Patent
Amano et al.

(10) Patent No.: US 10,302,124 B2
(45) Date of Patent: May 28, 2019

(54) HALF BEARING AND SLIDING BEARING

(71) Applicant: DAIDO METAL COMPANY LTD., Nagoya (JP)

(72) Inventors: Seiji Amano, Inuyama (JP); Akifumi Yamamoto, Inuyama (JP); Shinichi Sakurai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/038,338

(22) Filed: Jul. 18, 2018

(65) Prior Publication Data

US 2019/0032701 A1   Jan. 31, 2019

(30) Foreign Application Priority Data

Jul. 31, 2017 (JP) ................................. 2017-148218

(51) Int. Cl.
| | |
|---|---|
| *F16C 9/02* | (2006.01) |
| *F16C 33/10* | (2006.01) |
| *F16C 33/04* | (2006.01) |
| *F16C 17/02* | (2006.01) |

(52) U.S. Cl.
CPC .............. *F16C 9/02* (2013.01); *F16C 33/046* (2013.01); *F16C 33/107* (2013.01); *F16C 33/1065* (2013.01); *F16C 17/022* (2013.01); *F16C 2360/22* (2013.01)

(58) Field of Classification Search
CPC ...... F16C 9/02; F16C 33/046; F16C 33/1065; F16C 2360/22
See application file for complete search history.

(56) References Cited

U.S. PATENT DOCUMENTS

| 5,000,584 A | * | 3/1991 | Simmons ............... B21B 31/074 384/114 |
| 6,095,690 A | | 8/2000 | Niegel et al. |
| 7,399,122 B2 | * | 7/2008 | Fujita ......................... F16O 9/02 384/276 |
| 8,646,980 B2 | * | 2/2014 | Flores ....................... F16O 9/00 384/288 |

FOREIGN PATENT DOCUMENTS

| JP | S58-149622 A | 9/1983 |
| JP | H08-277831 A | 10/1996 |
| JP | 2000-504089 A | 4/2000 |
| JP | 2008-095721 A | 4/2008 |

* cited by examiner

*Primary Examiner* — Thomas R Hannon
(74) *Attorney, Agent, or Firm* — Snyder, Clark, Lesch & Chung, LLP (57) ABSTRACT

Provided is a semi-cylindrical shaped half bearing. The half bearing has an inner surface forming a sliding surface and including a plurality of recesses. Each recess has a smooth recess surface and a peripheral edge. The recess surface forms a convex curve toward the outer diameter side of the half bearing in cross-sectional view in a direction parallel to a circumferential direction of the half bearing. The recess includes a groove forming zone adjacent to the peripheral edge of the recess. The groove forming zone includes a plurality of circumferential grooves. The circumferential grooves extend from the peripheral edge of the recess along the circumferential direction of the half bearing. The present invention also provides a cylindrical sliding bearing including the above half bearing.

14 Claims, 8 Drawing Sheets

FIG. 8
COMPARATIVE EXAMPLE

HALF BEARING AND SLIDING BEARING

TECHNICAL FIELD

The present invention relates to a half bearing for constituting a sliding bearing for supporting a crankshaft of an internal combustion engine. The present invention also relates to a cylindrical sliding bearing including the half bearing and for supporting the crankshaft of the internal combustion engine.

BACKGROUND OF THE INVENTION

A crankshaft of an internal combustion engine is supported in its journal part by a lower portion of a cylinder block via a main bearing constituted by a pair of half bearings. With respect to the main bearing, lubrication oil is discharged by an oil pump and fed from an oil gallery in a cylinder block wall via a through hole in a wall of the main bearing into a lubrication oil groove formed along an inner surface of the main bearing. The journal part has a first lubrication oil passage passing through the journal part in a diameter direction of the journal part, and openings at both ends of the first lubrication oil passage communicate with the lubrication oil groove of the main bearing. Furthermore, a second lubrication oil passage passing through a crank arm part branches off from the first lubrication oil passage of the journal part and communicates with a third lubrication oil passage passing through a crankpin in a diameter direction of the crankpin. Thus, the lubrication oil fed from the oil gallery in the cylinder block wall via the through hole into the lubrication oil groove on the inner surface of the main bearing passes through the first lubrication oil passage, the second lubrication oil passage, and the third lubrication oil passage. The lubrication oil is then supplied from a discharge port which opens at an end of the third lubrication oil passage to a gap between the crankpin and a sliding surface of a connecting rod bearing constituted by a pair of half bearings (see JP 08-277831 A, for example). The oil is supplied to a gap between a surface of the crankshaft and a sliding surface of the main and the connecting rod bearing.

In order to reduce friction loss during sliding between the crankshaft and the half bearing, it has been proposed to form a plurality of minute recesses on a sliding surface of the half bearing (see JP 58-149622 U, JP 2008-95721 A and JP 2000-504089 A, for example).

SUMMARY OF INVENTION

As described above, JP 58-149622U, JP 2008-95721A and JP 2000-504089A disclose. a conventional half bearing having a plurality of minute recesses on a sliding surface. When the sliding surface of the half bearing becomes closer to a surface of a crankshaft during operation of an internal combustion engine, turbulence occurs in an oil flow near the recess. The turbulence causes friction loss and greatly reduces pressure of the oil between the sliding surface adjacent to the recess and the surface of the shaft. This causes the oil to become unbearable of a load of the shaft so that the surface of the shaft comes into contact with the sliding surface, and thus the friction loss is increased.

An object of the present invention is to provide a half bearing for constituting a sliding bearing of a crankshaft of an internal combustion engine, which is capable of reducing friction loss caused by occurrence of turbulence during operation of the internal combustion engine. Another object of the present invention is to provide the sliding bearing.

In an aspect of the present invention, a half bearing to is provided for constituting a sliding bearing for supporting a crankshaft of an internal combustion engine. The half bearing has a semi-cylindrical shape, and has an inner surface. The inner surface forms a sliding surface of the half bearing. The sliding surface includes a plurality of recesses. Each recess has a recess surface and a peripheral edge. The recess surface is smooth and is recessed from the sliding surface toward an outer diameter side of the half bearing. The recess surface forms a convex curve toward the outer diameter side of the half bearing, in cross-sectional view in a direction parallel to a circumferential direction of the half bearing. The recess includes a groove forming zone adjacent to the peripheral edge of the recess. The groove forming zone includes a plurality of circumferential grooves which recess from the recess surface toward the outer diameter side of the half bearing. The circumferential grooves extend from the peripheral edge of the recess along the circumferential direction of the half bearing.

According to an embodiment of the present invention, a depth $D1$ of the recess is preferably 2 to 50 μm. The depth $D1$ of the recess is defined as a length from the sliding surface to a deepest portion of the recess surface.

According to an embodiment of the present invention, a depth of the circumferential groove preferably increases from a center side of the recess toward a peripheral edge side of the recess.

According to an embodiment of the present invention, a maximum depth $D2$ of the circumferential groove is preferably 0.5 to 3 μm. The maximum depth $D2$ of the circumferential groove is defined as a length from the recess surface to the deepest portion of the circumferential groove.

According to an embodiment of the present invention, a maximum width $W$ of the circumferential groove is preferably 20 to 150 μm.

According to an embodiment of the present invention, an area ratio $S1$ of an area of the groove forming zone in relation to an area of the recess is preferably 0.15 to 0.55.

According to an embodiment of the present invention, an opening of the recess on the sliding surface preferably has a circular shape, an elliptical shape, or a quadrilateral shape.

According to an embodiment of the present invention, the recess surface preferably forms a convex curve recessing toward the outer diameter side of the half bearing in cross-sectional view in an axial direction of the half bearing.

According to an embodiment of the present invention, the recesses are preferably uniformly located throughout the sliding surface of the half bearing.

According to an embodiment of the present invention, as the recess is located closer to a circumferential center of the half bearing, the depth $D1$ of the recess (that is a length from the sliding surface to the deepest portion of the recess surface) preferably increases. In other words, as the recess is located closer to a circumferential end of the half bearing, the depth $D1$ of the recess preferably decreases.

According to an embodiment of the present invention, as the recess is located closer to a circumferential center of the half bearing, an area $A1$ of the opening of the recess preferably increases. In other words, as the recess is located closer to a circumferential end of the half bearing, the area $A1$ of the opening of the recess preferably decreases.

According to an embodiment of the present invention, as the recess is located closer to a circumferential center of the half bearing, an area ratio $S1$ of an area of the groove forming zone in relation to an area of the entire recess preferably decreases. In other words, as the recess is located closer to a circumferential end of the half bearing, the area ratio S1 preferably increases.

In another aspect, the present invention also provides a cylindrical sliding bearing for supporting a crankshaft of an internal combustion engine, including the above half bearing. The sliding bearing is preferably constituted by combining a pair of the half bearings together.

DESCRIPTION OF EMBODIMENTS

Embodiments of the present invention will be described below with reference to the drawings.

Figure 1:
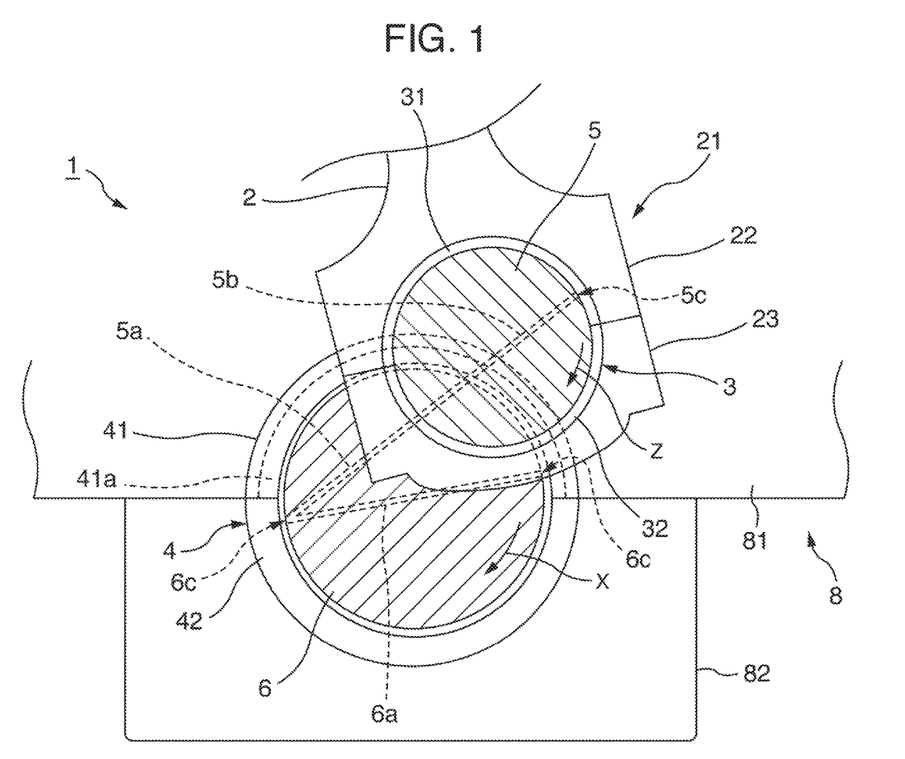
FIG. 1 is a schematic diagram showing a bearing device of a crankshaft.

FIG. 1 schematically shows a bearing device 1 of an internal combustion engine. The bearing device 1 includes a journal part 6, a crankpin 5 and a connecting rod 2. The journal part 6 is supported by a lower portion of the cylinder block 8. The crankpin 5 is integrally formed with the journal part 6 and rotates about the journal part 6. The connecting rod 2 transmits reciprocating motion from the internal combustion engine to the crankpin 5. The bearing device 1 further includes sliding bearings for supporting a crankshaft, one of which is a main bearing 4 rotatably supporting the journal part 6 and another is a connecting rod bearing 3 rotatably supporting the crankpin 5.

Please note that description will be made with reference to a single journal part 6 and a single crankpin 5 in the drawings for convenience of description, while the crankshaft includes a plurality of journal parts 6 and a plurality of crankpins 5. With regard to a positional relationship between the journal part 6 and the crankpin 5 in a vertical direction of a page in FIG. 1, the journal part 6 is located behind the crankpin 5 in FIG. 1.

The journal part 6 is pivotally supported by a cylinder block lower portion 81 of the internal combustion engine via the main bearing 4 composed of a pair of half bearings 41 and 42. The half bearing 41 on an upper side in FIG. 1 has an oil groove 41a which extends along the entire length of an inner surface of the half bearing 41. The journal part 6 has a lubrication oil passage 6a which passes through the journal part 6 in a diameter direction of the journal part 6. When the journal part 6 rotates in a direction of an arrow X, entrance openings 6c at both ends of the lubrication oil passage 6a alternately communicate with the oil groove 41a of the main bearing 4.

The crankpin 5 is pivotally supported by a large end housing 21 (a rod-side large end housing 22 and a cap-side large end housing 23) of the connecting rod 2 via the connecting rod bearing 3 composed of a pair of half bearings 31 and 32.

In the main bearing 4, lubrication oil discharged by an oil pump is fed from an oil gallery of a cylinder block wall, via a through hole of a wall of the main bearing 4, into the oil groove 41a formed along an inner surface of the main bearing 4, as described above.

Furthermore, the first lubrication oil passage 6a passes through the journal part 6 in the diameter direction of the journal part 6, and the entrance openings 6c of the first lubrication oil passage 6a communicate with the lubrication oil groove 41a. A second lubrication oil passage 5a passing through a crank arm part (not shown) branches off from the first lubrication oil passage 6a of the journal part 6 and communicates with a third lubrication oil passage 5b passing through the crankpin 5 in a diameter direction of the crankpin 5.

Thus, the lubrication oil passes through the first lubrication oil passage 6a, the second lubrication oil passage 5a, and the third lubrication oil passage 5b and is supplied from a discharge port 5c at an end of the third lubrication oil passage 5b to a gap formed between the crankpin 5 and the connecting rod bearing 3.

In general, the main bearing 4 and the connecting rod bearing 3 bear a dynamic load from the crankshaft by pressure generated in oil between a sliding surface of the main bearing 4 and the connecting rod bearing 3 and a surface of the shaft. Throughout operation of the internal combustion engine, the load and its direction constantly change, which is applied to the sliding surface of the main bearing 4 and the connecting rod bearing 3. Central axes of the journal part 6 and the crankpin 5 move eccentrically with respect to a bearing central axis of, respectively, the main bearing 4 and the connecting rod bearing 3 so that oil film pressure generates proportionally to the load. Accordingly, a bearing gap of the main bearing 4 and the connecting rod bearing 3 (gap between the surface of the shaft and the sliding surface) constantly changes at any position on the sliding surface. For example, in the case of a four-stroke internal combustion engine, the maximum load is applied to the connecting rod bearing and the main bearing in a combustion stroke. In this case, for example for the connecting rod bearing, the crankpin 5 moves in a direction (indicated by "arrow M") toward the sliding surface near a circumferential center of the half bearing on the upper side in FIG. 1. Then, the sliding surface near the circumferential center of the half bearing becomes closest to a surface of the crankpin, and a load is applied in the direction toward the sliding surface near the circumferential center of the half bearing.

For the main bearing, a load is applied in a direction toward the sliding surface near a circumferential center of the half bearing provided on a bearing cap 82 side on a lower side in FIG. 1, and the sliding surface near the circumferential center of the half bearing on the lower side becomes closest to a surface of the journal part 6.

A conventional half bearing having a sliding surface including a plurality of minute recesses have following problems. When a surface of a shaft separated from the sliding surface of the half bearing having the minute recesses moves relatively closer to the sliding surface and the surface of the shaft becomes closest to the sliding surface, oil in the recess is compressed to high pressure and flows out from the recesses to a gap between the sliding surface and the surface of the shaft. In a case where the minute recesses have a smooth surface, among the oil flows that overflow from the recesses into the gap, only part of the oil flow flows toward the same direction as a rotating direction of the shaft, and most of the oil flow flows toward a direction different from the shaft rotating direction. Since an oil flow following the rotating surface of the shaft has been formed in the gap between the sliding surface and the surface of the shaft, when the oil flow toward a direction different from the rotating direction of the shaft flows out from the recesses, the oil flows flowing in different directions collide with each other between the sliding surface adjacent to an opening of the recess and the surface of the shaft, thereby causing turbulence. The occurrence of turbulence causes friction loss. When the turbulence greatly reduces pressure of the oil between the sliding surface adjacent to the opening of the recess and the surface of the shaft, a load of the shaft becomes unbearable so that the surface of the shaft comes into contact with the sliding surface, and thus the friction loss is increased.

The present invention addresses such problems of the conventional techniques. According to a half bearing of the present invention, a recess has a smooth recess surface which recesses from a sliding surface toward an outer diameter side of the half bearing. The recess has a groove forming zone adjacent to a peripheral edge of the recess, and the groove forming zone has a plurality of circumferential grooves which recesses from the recess surface toward the outer diameter side of the half bearing. The recess surface forms a convex curve recessing toward the outer diameter side of the half bearing in cross-sectional view in a direction parallel to a circumferential direction of the half bearing. The circumferential grooves extend parallel to the circumferential direction of the half bearing.

Herein, the term "recess surface" indicates a surface of the recess excluding the circumferential grooves. A "plane zone" is defined as a largest zone as far as it does not intersect the circumferential grooves, and the plane zone has a center is at the same position as that of the recess and has a similar shape as an opening of the recess. The "opening of the recess" indicates a face (or a virtual extension surface of the sliding surface) on which the recess intersects the sliding surface, in other words, the "opening of the recess" has a shape of the recess viewed from a direction perpendicular to the sliding surface. The "groove forming zone" indicates a zone on the surface of the recess other than the plane zone. The "groove forming zone" includes both the smooth recess surface and the circumferential grooves.

In the following, exemplary half bearing of the present invention applied to the connecting rod bearing 3 will be described. Please note that the present invention is not limited to the connecting rod bearing 3 and may be configured as the half bearing for constituting the main bearing 4.

It is possible to employ the half bearing of the present invention as both of a pair of half bearings constituting the connecting rod bearing 3 or the main bearing 4. Alternatively, only one of the pair of half bearings constituting the connecting rod bearing 3 or the main bearing 4 may be the half bearing of the present invention and another half bearings may be a conventional half bearing having no recesses on a sliding surface.

Figure 2:
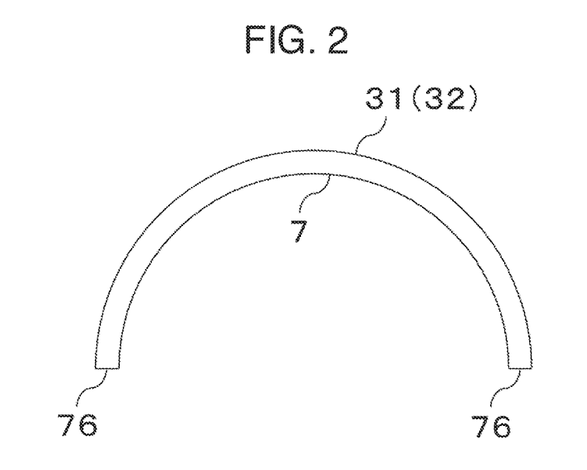
FIG. 2 shows a half bearing according to a first embodiment of the present invention, viewed from an axial direction of the half bearing.

FIG. 2 shows a first embodiment of the half bearing (for a connecting rod bearing 3) according to the present invention. The connecting rod bearing 3 is formed by combining a pair of half bearings 31 and 32 into a cylindrical shape as a whole so that circumferential end faces 76 of the half bearing 31 abut with circumferential end faces 76 of the half bearing 32. An inner surface of the cylindrical shape forms a sliding surface 7.

Preferably, the bearing halve 31, 32 has a constant thickness in a circumferential direction. However, the bearing halve 31, 32 may have a changing thickness, for example the thickness is maximum at a circumferential center and continuously decreases toward the circumferential end faces 76.

Figure 3:
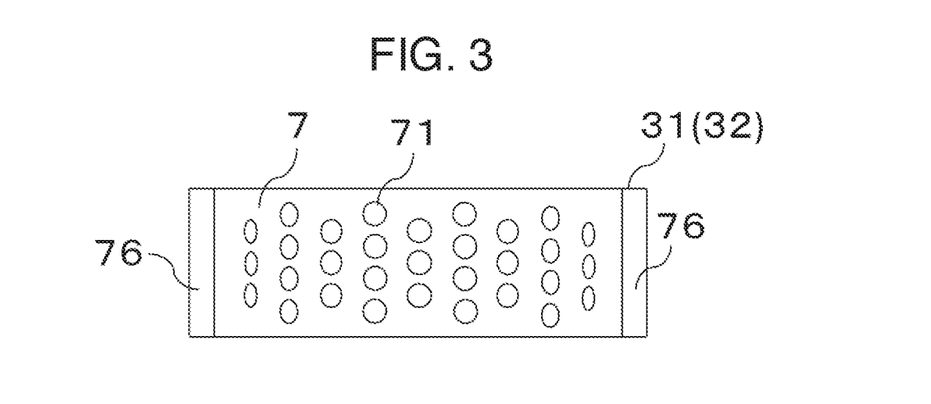
FIG. 3 is a plan view of the half bearing in FIG. 2, viewed from a sliding surface side.
Figure 4:
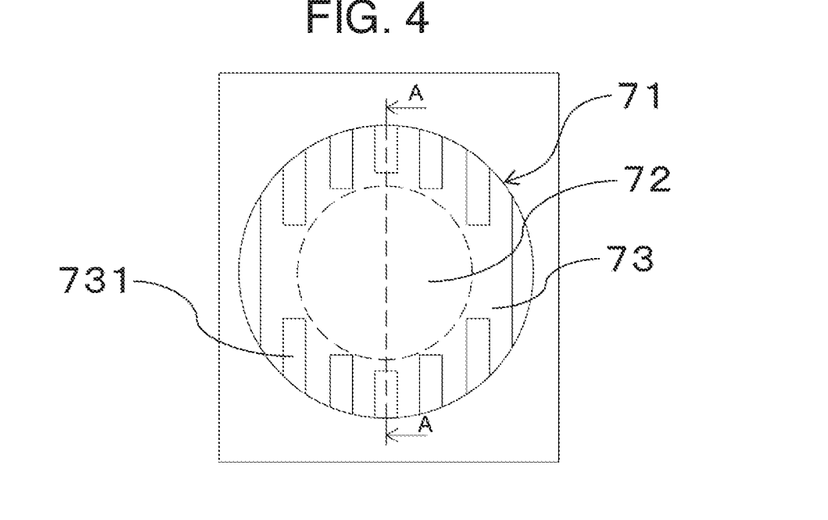
FIG. 4 shows a recess in FIG. 3, viewed from the sliding surface side.

FIG. 3 shows an example of recesses on the sliding surface of the half bearing, and FIG. 4 shows an example of a recess viewed from a sliding surface side. Please note that the present invention is not limited to the embodiment. For easier understanding, the recesses 71 are exaggerated in the drawings.

A plurality of recesses 71 is located on a sliding surface 7 of the bearing halve 31, 32. In this embodiment, the recesses 71 have openings having the same shape and size, such as a depth, are uniformly arranged substantially throughout the sliding surface. The "uniform arrangement" of the plurality of recesses 71 on the sliding surface 7 does not indicate strictly geometrically uniform but may be approximately or substantially uniform. Since FIG. 3 is a plan view of the half bearing having a semi-cylindrical shape 31, 32 viewed from the sliding surface side, the recesses near the circumferential ends 76 appear distorted in FIG. 3.

FIG. 4 shows the recess 71 having a circular opening. The recess 71 includes a plane zone 72 and a groove forming zone 73. The plane zone 72 is a smooth central surface of the recess 71 and the groove forming zone 73 is located adjacent to a peripheral edge of the recess 71 and includes a plurality of circumferential grooves 731. In the groove forming zone 73, the circumferential grooves 731 extend from the peripheral edge of the recess 71 along the circumferential direction of the bearing halve on a smooth surface extending from the plane zone 72. In FIG. 4, a zone surrounded by a dashed line is the plane zone 72, and the groove forming zone 73 is between the dashed line and the peripheral edge of the recess.

Figure 5:
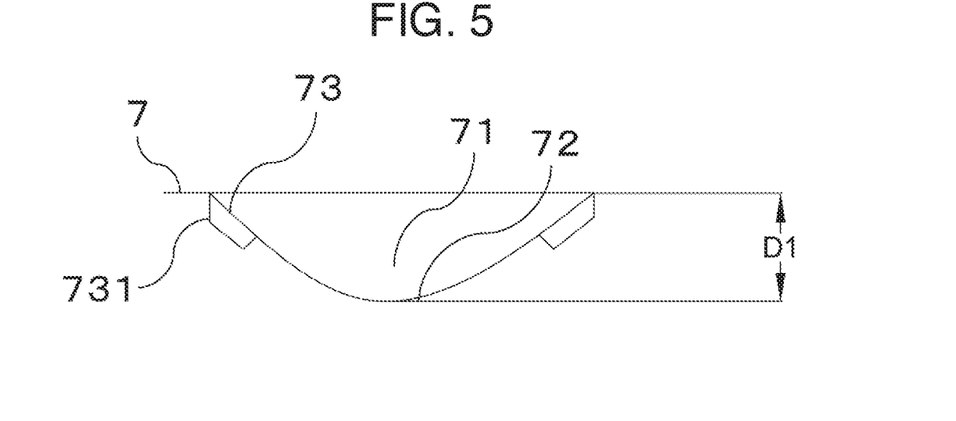
FIG. 5 is a cross-sectional view of an A-A cross section (in circumferential direction) in FIG. 4.

The recess surface (surface of the recess excluding the circumferential grooves) curves and recesses toward an outer diameter side of the bearing halve 31, 32 in cross-sectional view (A-A cross section in FIG. 4) in a direction parallel to the circumferential direction of the bearing halve 31, 32. That is, the recess surface forms a convex curve toward the outer diameter side (FIG. 5).

In an embodiment, the recess 71 may also form a curve which recesses toward the outer diameter side of the bearing halve 31, 32 in cross-sectional view (e.g., cross section in a direction perpendicular to the sliding surface 7) in any direction as well as the direction parallel to the circumferential direction of the bearing halve 31, 32.

The recess 71 has a depth D1 from the sliding surface 7 (that is a depth at the deepest part of the recess from the sliding surface adjacent to the recess) of preferably 2 to 50 µm, more preferably 2 to 30 µm. In a case where the opening of the recess 71 on the sliding surface 7 has a circular shape, the opening may have a diameter of 0.05 to 5 mm. In a case where the opening of the recess 71 has a shape other than the circular shape, the opening may have the same area as that of the circle having the above diameter (equivalent circle diameter).

While the plurality of circumferential grooves 731 extend from the peripheral edge of the recess 71 in the direction parallel to the circumferential direction of the bearing halve 31, 32, the term "parallel" allows that the grooves are slightly tilted (up to 1°) with respect to the circumferential direction of the bearing halve 31, 32.

In an embodiment, the circumferential groove 731 has a depth D2, that is a depth from a smooth surface of the groove forming zone, and the depth D2 may be made constant along a longitudinal direction or a direction in which the groove 731 extends, except in a circumferential end region. Furthermore, a width W of the groove 731 (that is a length of the groove in an axial direction of the half bearing) is also made constant along the longitudinal direction of the circumferential groove 731. A cross section of the circumferential groove 731 may be shaped rectangular.

The depth D2 of the circumferential groove 731 is preferably 0.5 to 3 µm. The depth D2 of the circumferential groove 731 may be smaller than the depth D1 of the recess 71. The width W of the circumferential groove 731 is preferably 20 to 150 µm. The width W of the circumferential groove 731 are preferably determined such that at least three circumferential grooves 731 are formed in a single recess 71. The depth D2 and the width W of the circumferential groove 731 may be changed along the longitudinal direction of the circumferential groove 731. In such a case, the maximum depth and the maximum width of the circumferential groove 731 are preferably sized to meet the above described depth and width sizes.

Preferably, the recess 71 has an area ratio S1 of the groove forming zone 73 to the recess being 0.15 to 0.55. The area A1 of the recess is defined as an area viewed from the sliding surface side (i.e., the recess viewed from the direction perpendicular to the sliding surface). The area A2 of the groove forming zone is defined as an area viewed from the sliding surface side (i.e., the recess viewed from the direction perpendicular to the sliding surface). The area of the plane zone is similarly defined.

The area ratio S1 is defined as an ratio (A2/A1) of the area A2 of the groove forming zone 73 to the area A1 of the recess (which is a sum of the area of the plane zone 72 and the area of the groove forming zone 73) (see FIG. 4).

The connecting rod bearing 3 of the embodiment is formed by combining a pair of half bearings 31 and 32 into a cylindrical shape as a whole so that the circumferential end faces 76 of the half bearing 31 are butted against the circumferential end faces 76 of the half bearing 32. The half bearing 31, 32 may have a sliding layer made of a Cu bearing alloy or an Al bearing alloy. Alternatively, the bearing halve 31, 32 may have a sliding layer made of a Cu bearing alloy or an Al bearing alloy on a back-metal layer made of an Fe alloy. The sliding surface 7 (that is a surface of the sliding layer including an inner surface of the recess 71) is the inner surface of the cylindrical shape and may have a surface part made of one of Bi, Sn, and Pb, which are softer than the bearing alloy, or an alloy including the metals as a main component. Alternatively, the surface part may be made of a resin composition including synthetic resin as a main component. However, the surface of the recess 71 preferably does not have such a surface part. If the surface of the recess 71 or the surface of the circumferential grooves 731 has such soft surface part, when oil contains many foreign substances, the foreign substances are more likely to be embedded and accumulated. If the foreign substances are embedded and accumulated on the surface of the recess 71 or the surface of the circumferential grooves 731, turbulence is more likely to occur in the oil flowing in the recess.

As described above, the half bearing of the present invention has the recesses 71 on the sliding surface and each recess includes the plane zone 72 and the groove forming zone 73. The half bearing can reduce friction loss. A reason thereof will be described below.

Figure 6:
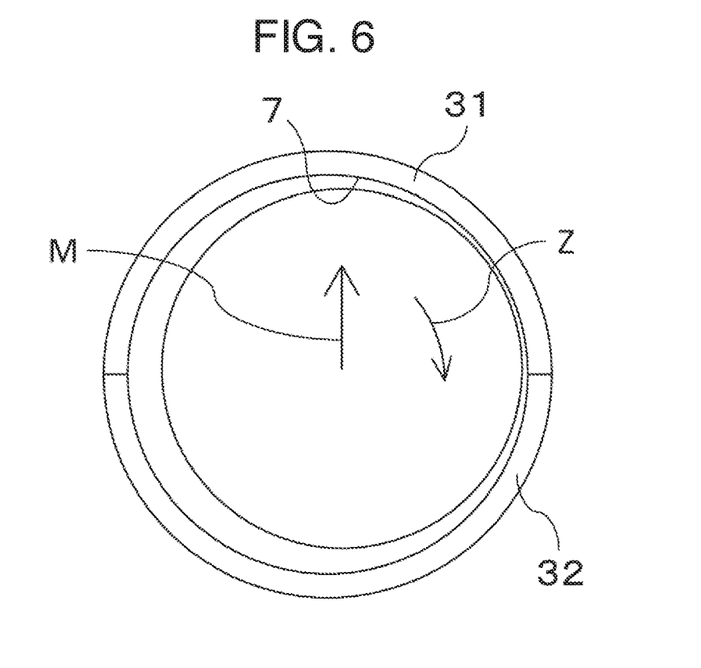
FIG. 6 shows relative movement of a shaft to half bearings.
Figure 7:
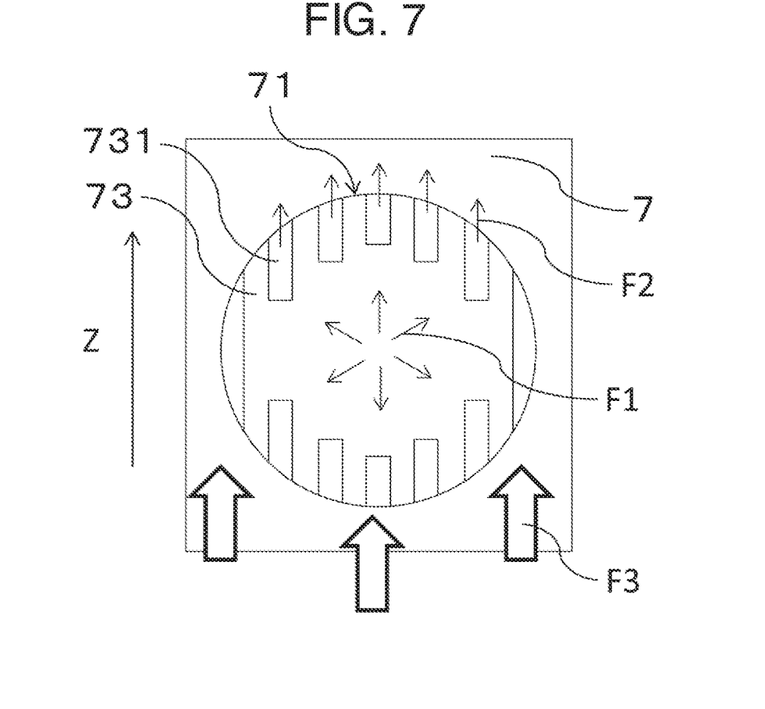
FIG. 7 shows oil flows in the recess in FIG. 4.

FIG. 6 shows a state where a surface of the shaft 5 distant from the sliding surface 7 of the half bearing 31 having the plurality of recesses 71 has moved to become relatively closer to the sliding surface 7 and the surface of the shaft 5 has become closest to the sliding surface 7. In this state, the oil in the recess 71 is most compressed to generate high pressure particularly near a center of the recess surface of the opening. However, since the surface in the plane zone 72 of the opening is smooth, an oil flow F1 flows in all directions (FIG. 7). The oil flow F1 is also formed in a direction different from a rotating direction Z of the shaft. However, in the recess 71, the groove forming zone 73 adjacent to the peripheral edge of the opening has the plurality of circumferential grooves 731 which extend in the direction parallel to the circumferential direction of the half bearing 31. Thus, the oil flow F1 flowing from the plane zone 72 is guided to the circumferential grooves 731 and flows (oil flow F2 in FIG. 7) toward the same direction as the circumferential direction of the half bearing 31 (rotating direction Z of the shaft). The oil flow then flows out in the same direction as the circumferential direction of the half bearing 31 toward a gap between the sliding surface 7 of the half bearing 31 and the surface of the shaft.

In the gap between the sliding surface 7 and the surface of the shaft 5, an oil flow F3 following the rotating surface of the shaft has been formed (FIG. 7). The oil flow F3 flows toward the same direction as the oil flow F2 flowing from the recess 71. Accordingly, turbulence is less likely to occur, and thus friction loss is less likely to occur.

Figure 8:
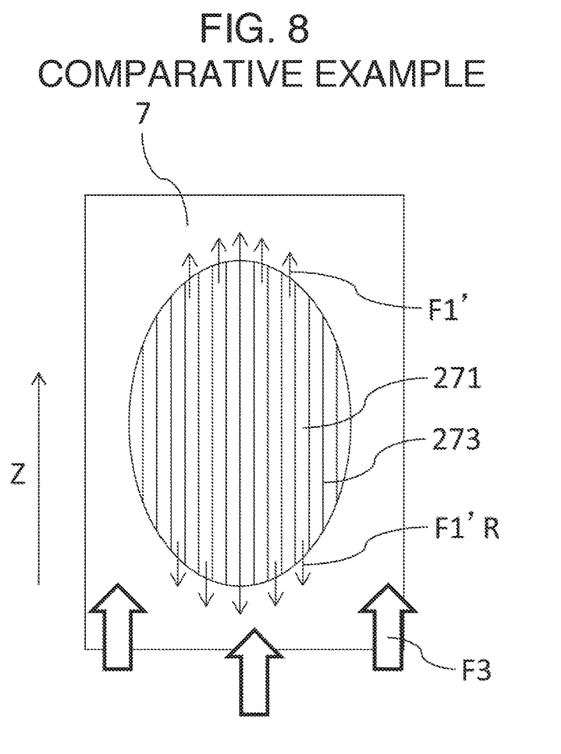
FIG. 8 shows a recess of Comparative Example, viewed from the sliding surface side.

FIG. 8 shows a recess 271 which is different from the present invention, viewed from the sliding surface side. The recess 271 has an elliptical opening on the sliding surface 7. Throughout a surface of the recess 271 including the surface near a center of the recess 271, the recess 271 has circumferential grooves 273 which are parallel to the circumferential direction of the half bearing, and the recess 271 has no plane zone. Other configurations are the same as those described above.

FIG. 8 shows oil flows F1' and F1'R flowing from the recess 271 into the gap between the sliding surface 7 and the surface of the shaft when the sliding surface 7 becomes closest to the surface of the shaft. As described above, an arrow Z indicates the rotating direction of the shaft (moving direction of the surface of the shaft).

When the sliding surface 7 becomes closest to the surface of the shaft, oil in the recess 271 is compressed to have high pressure, and in particular, high pressure is generated in the oil near the surface near the center of the recess 271, at which the recess is deepest. In FIG. 8, since this zone also has the circumferential grooves 273, the oil at particularly high pressure is guided to the circumferential grooves 273. This causes the oil in the recess 271 to form not only the oil flow F1' flowing in the same direction as the shaft rotation direction Z toward the gap between the sliding surface 7 and the surface of the shaft, but also the oil flow F1'R flowing in a direction opposite to the shaft rotation direction Z.

In the gap between the sliding surface 7 and the surface of the shaft 5, an oil flow F3 following the rotating surface of the shaft has been formed. When the oil flow F1'R and the oil flow F3, which flow in opposite directions collide with each other between the sliding surface 7 adjacent to the opening of the recess 271 and the surface of the shaft, turbulence occurs. The occurrence of turbulence causes friction loss. When the turbulence greatly reduces pressure of the oil between the sliding surface 7 adjacent to the opening of the recess 271 and the surface of the shaft, a load of the shaft becomes unbearable so that the surface of the shaft comes into contact with the sliding surface, and thus the friction loss is increased.

Alternative non-limiting embodiments of the present invention will be described below.

Second Embodiment

Figure 9:
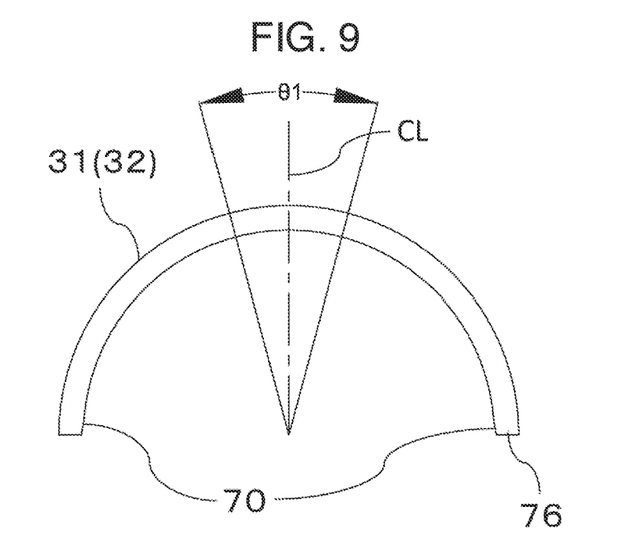
FIG. 9 shows the half bearing according to a second embodiment of the present invention, viewed from the axial direction of the half bearing.
Figure 10:
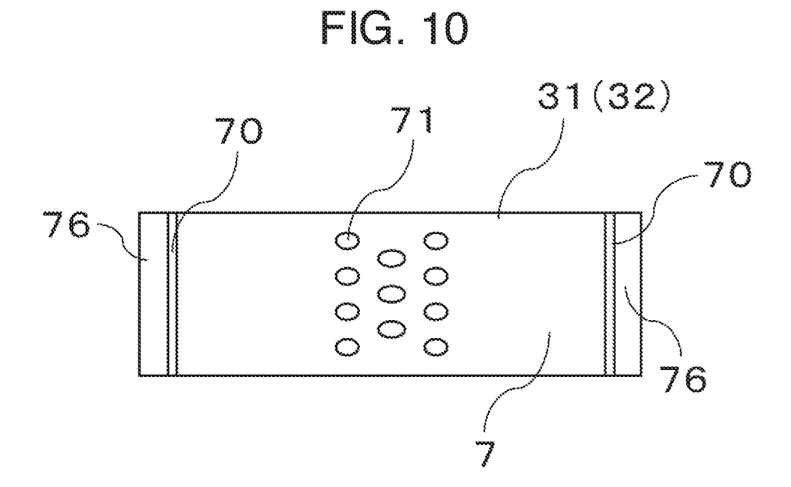
FIG. 10 is a plan view showing the half bearing in FIG. 9, viewed from the sliding surface side.

Referring to FIGS. 9 and 10, a plurality of recesses 71 are uniformly located only in a range of predetermined circumferential angle θ1 (−15° to 15°), where the circumferential angle θ1 is taken in reference to a circumferential center CL of the bearing halve 31, 32. The bearing halve 31, 32 may have crush relieves 70 at the circumferential ends 76 of the sliding surface 7. Other configurations are the same as those of the bearing halve 31, 32 described above.

The crush relieves 70 are formed by reducing a thickness of a wall in a radial direction and their surfaces are tapered from the original sliding surface 7 in circumferential end zones of the bearing halve 31, 32. The crush relieves 70 are formed, for example, in order to absorb positional deviation or deformation of the circumferential end faces 76 when the half bearings 31 and 32 are assembled in the connecting rod 2. Accordingly, a center of circle of the curvature of the surface of the crush relieve 70 differs from a center of circle of curvature of the sliding surface 7 of the center zone (see SAE J506 (Items 3.26 and 6.4); DIN 1497, Section 3.2; and JIS D3102). For a bearing for a small internal combustion engine for a passenger vehicle, a depth of the crush relieves 70 at the circumferential ends of the half bearing (distance from the original sliding surface to the crush relieves 70 at the circumferential ends 76) is generally about 0.01 to 0.05 mm.

A range where the recesses 71 are formed is not limited only to near the circumferential center of the bearing halve 31, 32, but the recesses 71 may be formed in any circumferential range on the sliding surface 7. The recess 71 may be formed in the crush relieves 70.

Third Embodiment

Referring to FIGS. 11 to 14, while a plurality of recesses 71 are substantially uniformly located on the sliding surface, each recess has an elliptical opening with its major axis extending along a direction parallel to the circumferential direction of the bearing halve 31, 32. The major axis of the elliptical opening of the recess may extend along a direction other than the direction parallel to the circumferential direction. For example, it may extend along an axial direction of the bearing halve 31, 32.

Figure 11:
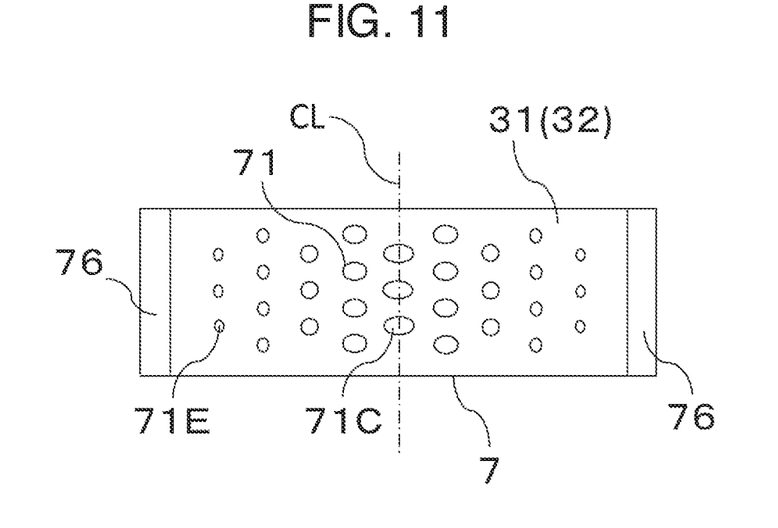
FIG. 11 shows the half bearing according to a third embodiment of the present invention, viewed from the sliding surface side.

The recess 71 has a curved surface which recesses toward the outer diameter side (convex toward the outer diameter side) of the bearing halve 31, 32 not only in cross-sectional view in a direction parallel to the circumferential direction of the bearing halve 31, 32 but also in cross-sectional view in any direction other than the direction parallel to the circumferential direction.

Figure 14:
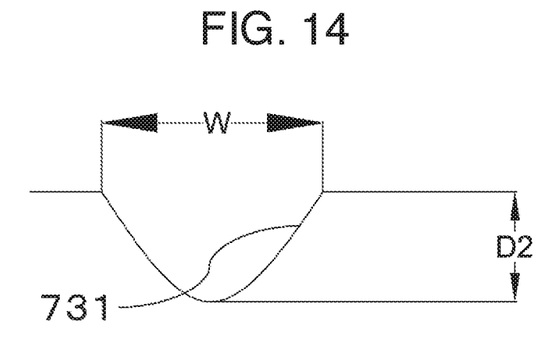
FIG. 14 is a cross-sectional view of a circumferential groove in a recess of the half bearing in FIG. 11.

Circumferential grooves 731 in the recess 71 have an arcuate cross section (see FIG. 14). Except the grooves at end regions of the recess 71 in an axial direction of the half bearing, a width W of the groove 731 is maximum on a peripheral edge side of the recess and decreases toward a center side of the recess. Similarly, a depth D2 of the circumferential groove 731 is maximum on the peripheral edge side of the recess and decreases toward the center side of the recess.

As the recess 71 is located closer to the circumferential center CL of the bearing halve 31, 32, the depth D1 (maximum depth) of the recess 71 increases. In other words, as the recess 71 is located closer to the circumferential end 76, the depth D1 decreases. Furthermore, as the recess 71 is located closer to the circumferential center CL of the bearing halve 31, 32, an area A1 of the recess 71 increases. In other words, as the recess 71 is located closer to the circumferential end 76, the area A1 decreases.

Furthermore, as the recess 71 is located closer to the circumferential center CL of the bearing halve 31, 32 in the circumferential direction, an area ratio S1 of a groove forming zone to the recess decreases. In other words, as the recess 71 is located closer to the circumferential end 76, the area ratio S1 increases.

Figure 12:
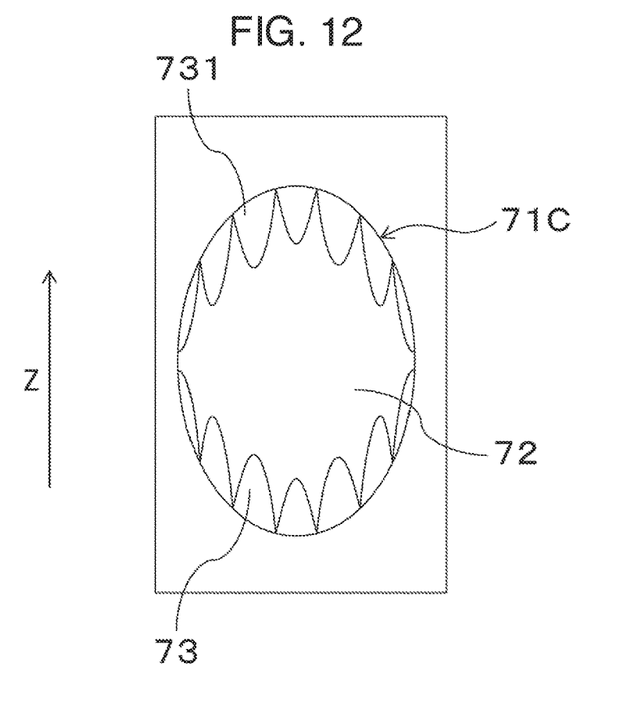
FIG. 12 shows a recess located on a circumferential center side of the half bearing in FIG. 11, viewed from the sliding surface side.
Figure 13:
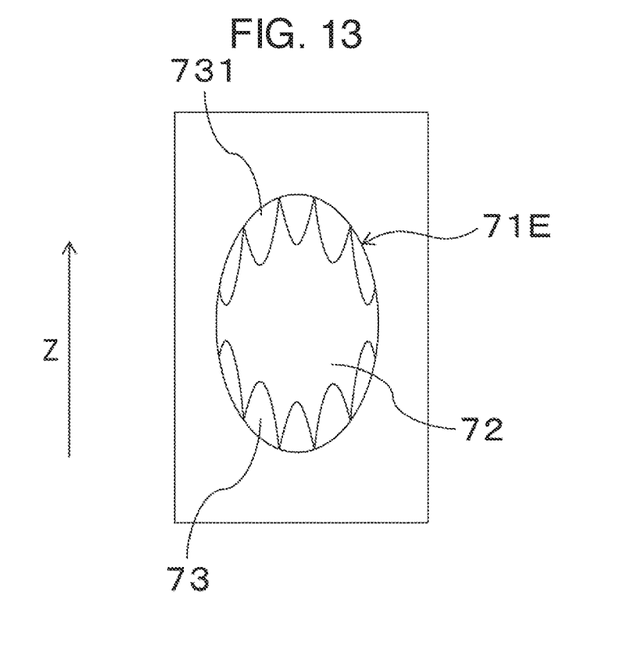
FIG. 13 shows a recess located on a circumferential end side of the half bearing in FIG. 11, viewed from the sliding surface side.

FIG. 12 shows a recess 71C viewed from the sliding surface 7 side, located close to the circumferential center CL. FIG. 13 shows a recess 71E viewed from the sliding surface 7 side, located close to the circumferential end 76.

Figure 15:
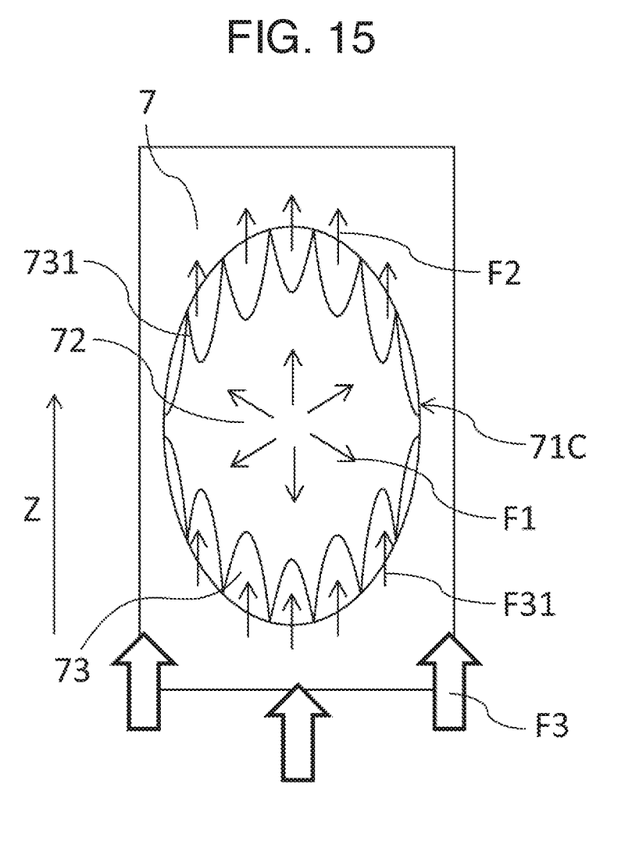
FIG. 15 shows oil flows in the recess of the half bearing in FIG. 11.

In a four-stroke internal combustion engine, as the recess is located closer to the circumferential center of the half bearing, oil pressure in the recess becomes higher, and as the recess is located closer to the circumferential end face of the half bearing, the oil pressure in the recess is less increased. In the embodiment, as the recess 71 is located closer to the circumferential center CL, an area ratio S1 of the groove forming zone 73 to the recess decreases and the area ratio of the plane zone 72 increases. FIG. 15 shows the recess 71C, viewed from the sliding surface side, located close to the circumferential center CL of the sliding surface 7 of the bearing halve 31, 32. FIG. 15 shows an oil flow F2 flowing from the recess 71C into the gap between the sliding surface 7 and a surface of a shaft when the sliding surface 7 becomes closest to the surface of the shaft 5. An arrow Z indicates a rotating direction of the shaft.

If the area ratio S1 of the groove forming zone 73 is high and the area ratio of the plane zone 72 is low, the oil whose pressure has become high near the center of the opening of the recess is guided to the circumferential grooves 731, and the oil flow F2 flowing may be formed in the same direction as the shaft rotation direction Z from the recess 71 toward the gap, as well as an oil flow flowing in a direction opposite to the shaft rotation direction Z. When the oil flow flowing in the direction opposite to the shaft rotation direction Z is formed, the oil flow collides with an oil flow F3 which follows the surface of the shaft and flows in a direction parallel to the shaft rotation direction Z, and this causes turbulence.

On the other hand, as in the recess 71C of the embodiment where the area ratio S1 of the groove forming zone 73 is low and the area ratio of the plane zone 72 is high, an oil flow F1 flowing toward a direction different from the shaft rotation direction Z is more likely to be formed in the plane zone 72, and thus fewer oil flow components of the oil flow F1 flow in the direction opposite to the shaft rotation direction Z. When the area of the plane zone 72 is large, pressure of the oil whose pressure has become high in the plane zone 72 near the center of the recess 71C is more likely to be reduced before the oil reaches the groove forming zone 73. Accordingly, due to the circumferential grooves 731 formed on a rear side in the shaft rotation direction Z of the recess 71C, an oil flow F31 is guided into the recess 71C and is formed from part of the oil flow F3 which follows the surface of the shaft and flows in the gap in the direction parallel to the rotating direction Z of the shaft.

In the recess 71E, however, pressure of oil is less likely to become high even when the surface of the shaft becomes closest to a surface of the recess 71E. Thus, an oil flow flowing in a direction opposite to the shaft rotation direction Z is less likely to be formed from the oil in the recess 71E. Accordingly, it is preferable to increase the area ratio of a groove forming zone 73 to the recess 71E to enhance an effect that the circumferential grooves 731 allows the oil in the recess 71E to form an oil flow F2 flowing toward the same direction as the shaft rotation direction Z.

Fourth Embodiment

Figure 16:
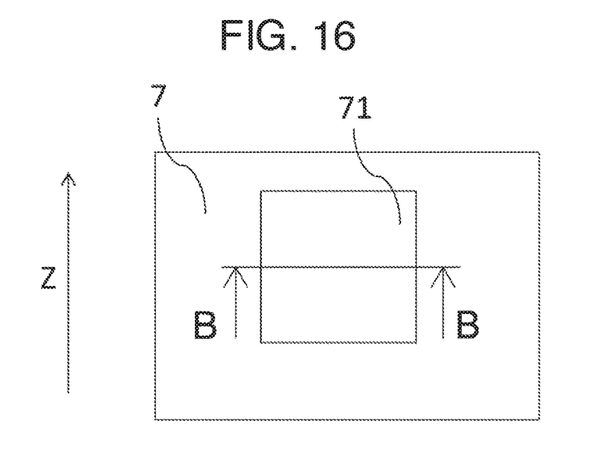
FIG. 16 shows a recess of the half bearing according to a fourth embodiment of the present invention, viewed from the sliding surface side.

FIG. 16 shows a recess 71 having a quadrilateral opening on the sliding surface 7. An arrow Z indicates the rotation direction of the shaft. Two sides of the quadrilateral opening of the recess are parallel to the rotation direction of the shaft. Please note that circumferential grooves 731 are omitted in FIG. 16.

Figure 17:
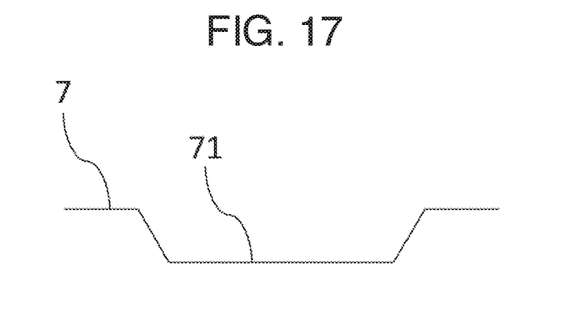
FIG. 17 is a cross-sectional view of a B-B cross section (in axial direction) of the recess in FIG. 16.

FIG. 17 shows a B-B cross sectional view (cross section in the axial direction of the bearing halve 31, 32) of the recess 71 in FIG. 16. The cross section has a reverse trapezoidal shape, and a surface of the recess 71 is parallel to the sliding surface 7, excluding the surface at both ends in the axial direction. Please note that the circumferential grooves 731 are omitted in FIG. 17. The surface of the recess 71 in cross-sectional view in a direction parallel to the circumferential direction of the bearing halve 31, 32 is a curved surface recessing toward the outer diameter side of the bearing halve 31, 32.

Fifth Embodiment

Figure 18:
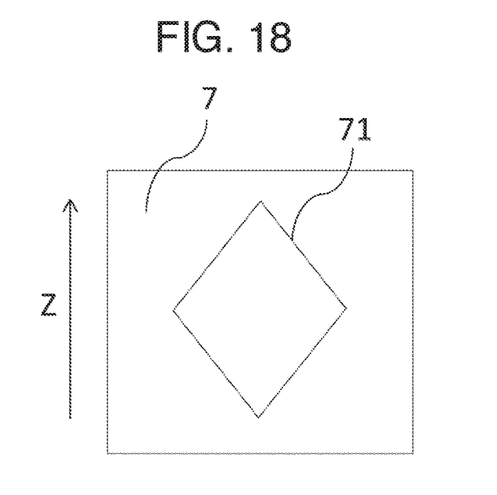
FIG. 18 shows a recess of the half bearing according to a fifth embodiment of the present invention, viewed from the sliding surface side.

FIG. 18 shows a recess 71 having a quadrilateral opening on the sliding surface 7. Unlike FIG. 16, a diagonal line of the quadrilateral opening of the recess is parallel to the rotation direction of the shaft. In the recess 71 in FIG. 18, a surface of the recess 71 in cross-sectional view in a direction parallel to the circumferential direction of the bearing halve 31, 32 is curved and recesses toward the outer diameter side of the bearing halve 31, 32. Also, the surface of the recess 71, in cross-sectional view in a direction parallel to the axial direction of the bearing halve 31, 32, is curved and recesses toward the outer diameter side. Also in FIG. 18, circumferential grooves 731 are omitted.

As stated above, circular, elliptical, and quadrilateral shapes are explained as the shape of the opening of the recess 71. However, these shapes of the opening do not indicate geometrically precise circular, elliptical, and quadrilateral shapes and they may be substantially circular, elliptical, and quadrilateral. Furthermore, the shape of the opening of the recess 71 is not limited to these shapes and other shapes may be applied.

The above description is made to the embodiment where the half bearing of the present invention is applied to the connecting rod bearing supporting a crankpin of a crankshaft of an internal combustion engine. The half bearing of the present invention is also applicable to one or both of the pair of half bearings constituting a main bearing supporting a journal part of the crankshaft. Furthermore, the half bearing may have an oil hole or an oil groove. The half bearing may be configured such that a plurality of grooves extending in the circumferential direction of the half bearing are located throughout the sliding surface excluding the recess 71.

The invention claimed is:

1. A half bearing for constituting a sliding bearing for supporting a crankshaft of an internal combustion engine, the half bearing having a semi-cylindrical shape having an inner surface, the inner surface forming a sliding surface,
   wherein the sliding surface of the half bearing comprises a plurality of recesses, each recess having a smooth recess surface and a peripheral edge, the recess surface recessing from the sliding surface toward an outer diameter side of the half bearing;
   wherein the recess surface forms a convex curve toward the outer diameter side of the half bearing in cross-sectional view in a direction parallel to a circumferential direction of the half bearing;
   wherein the recess comprises a groove forming zone adjacent to the peripheral edge of the recess, the groove forming zone comprising a plurality of circumferential grooves, the circumferential grooves recessing from the recess surface toward the outer diameter side of the half bearing; and
   wherein the circumferential grooves extend from the peripheral edge of the recess along the circumferential direction of the half bearing.

2. The half bearing according to claim 1, wherein a depth D1 of the recess is 2 to 50 μm.

3. The half bearing according to claim 1, wherein a depth D2 of the circumferential grooves increases from a center of the recess toward a peripheral edge side of the recess.

4. The half bearing according to claim 1, wherein a maximum depth (D2) of the circumferential groove is 0.5 to 3 μm.

5. The half bearing according to claim 1, wherein a maximum width W of the circumferential groove is 20 to 150 μm.

6. The half bearing according to claim 1, wherein an area ratio S1 of an area of the groove forming zone to an area of the recess is 0.15 to 0.55.

7. The half bearing according to claim 1, wherein an opening of the recess has a circular shape, an elliptical shape, or a quadrilateral shape.

8. The half bearing according to claim 1, wherein the recess surface forms a convex curve toward the outer diameter side of the half bearing in cross-sectional view in an axial direction of the half bearing.

9. The half bearing according to claim 1, wherein the plurality of recesses are uniformly located throughout the sliding surface of the half bearing.

10. The half bearing according to claim 1, wherein as the recess is located closer to a circumferential center CL of the half bearing, a depth D1 of the recess increases.

11. The half bearing according to claim 1, wherein as the recess is located closer to a circumferential center CL of the half bearing, an area A1 of the opening of the recess increases.

12. The half bearing according to claim 1, wherein as the recess is located closer to a circumferential center CL of the half bearing, an area ratio S1 of an area of the groove forming zone to an area of the recess decreases.

13. A sliding bearing for supporting a crankshaft of an internal combustion engine, comprising the half bearing according to claim 1, the sliding bearing having a cylindrical shape.

14. The sliding bearing according to claim 13, wherein the sliding bearing comprises a combination of a pair of the half bearings.

* * * * *